Figure 1:
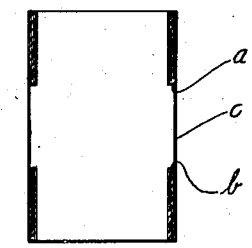

Sept. 7, 1943.   C. O. PIKE ET AL   2,328,845

METHOD OF MAKING TAMPER PROOF CLOSURE BAND

Filed March 14, 1939

Inventor
Charles O. Pike and
James E. Snyder

By

Attorney

Patented Sept. 7, 1943

2,328,845

UNITED STATES PATENT OFFICE 2,328,845

METHOD OF MAKING TAMPERPROOF CLOSURE BANDS

Charles O. Pike and James E. Snyder, Akron, Ohio, assignors to Wingfoot Corporation, Akron, Ohio, a corporation of Delaware Application March 14, 1939, Serial No. 261,756

4 Claims. (Cl. 18—56)

This invention relates to a method of producing a tamper proof closure band, such as a tamper proof band for closing a liquor bottle. The band is applied to a container which has already been closed with a cork or cap or other primary closure. On heating, the band is shrunk tight around the neck of the bottle or other container and over the joint formed where the cork or other closure fits into the neck. Once the band has been shrunk in place it cannot be removed and then replaced without showing evidence of tampering. The band is claimed in the divisional application Serial No. 387,844, filed April 10, 1941.

Bands of various types have been previously employed for bottles and other containers, the purpose being to give the purchaser the impression that the cork or other closure has not been removed from the bottle for dilution or adulteration of the contents between the time the bottle is filled and the time that it reaches the ultimate consumer. Bands also improve the appearance of the package and prevent contamination on the lip of the bottle. One type of band or hood now on the market is made of a cellulosic material which shrinks on becoming dry and expands on becoming moist. Such bands while wet are placed over the bottle tops and are then permitted to dry and thus shrink in place. Such bands are not tamper proof, strictly speaking, because on moistening they swell substantially to their original size and can then be easily removed and then later, after adulteration of the contents can be replaced on the bottle and shrunk to give their original appearance.

The tamper proof bands of the present invention are made of a thermoplastic material such as a stretched rubber hydrochloride film which shrinks on heating. The bands in the stretched condition are placed around the necks of the bottles or other containers and are then heated to cause them to shrink until they conform to the shape of the neck of the bottle or container and adhere to it closely. Such bands cannot easily be removed and reapplied without showing evidence of tampering.

The bands of this invention may, for example, be made by heating and stretching and then uniting several plies of cast rubber hydrochloride film in the form of a band. No adhesive is required for uniting the various plies. By pressing them together while in a heated condition they may readily be caused to cohere. The bands are advantageously stretched and united as a part of the same operation. The laminated film is cooled under tension so that on re-heating it will shrink. The plies may originally be about .001 to .002 of an inch thick. They may be made according to Calvert Patent 1,989,632 by passing hydrogen chloride gas through a rubber cement and then casting the resulting rubber hydrochloride cement to produce a film. Suitable types of film are the various grades of "Pliofilm" rubber hydrochloride film now on the market. This film may be unplasticized or it may contain a plasticizer such as butyl stearate, dibutyl phthalate, etc.

Two or more plies of such cast film heated above 140° F. and stretched as much as 500% of their original length and united by being passed between the rolls of a calender in a hot stretched condition so as to cause the various plies to coalesce give a film which may be as thin as .0003" or of any desired thickness from which the bands of this invention may be formed. Or a single ply may be similarly heated and stretched. Maximum stretch gives the tightest fitting closures on re-heating. The bands may be formed by cutting such stretched film and uniting pieces of desired length by solvent or adhesive or preferably by the use of heat and pressure.

There are other ways in which a suitable band may be formed. It may be made of unstretched rubber hydrochloride film wound around an expansible mandrel. The film may then be heated and stretched by expanding the mandrel. A cylindrical or flat expansible mandrel may be used. As an alternative method the band may be heated and stretched before winding it around the mandrel. The warm stretched layers cohere upon contact to form a substantially seamless band. When made on a mandrel it may be desirable to employ a paper slip sheet on the mandrel to prevent the film from sticking to the mandrel. Another alternative method is to form the stretched film directly around the container to be closed in a single or in multiple plies, seal the loose end to the ply beneath and shrink the band in place. Or the film may be heated, stretched and applied directly around the container under tension before the film has cooled. In the latter method one or more plies may be used, the outer plies and the end of the strip being caused to cohere to the inner plies due to the tackiness of the warm film.

The pre-formed bands made in any desired way have a diameter slightly larger than that of the bottle on which they are to be placed. These bands can easily be slipped over the neck of the bottle. They are stretched circumferentially, and on heating they shrink and are bound tightly to the bottle. If the neck of the bottle comprises a lip or other portion of somewhat larger diameter than the balance the band shrinks, on heating, and conforms to the shape of the neck and thereafter cannot readily be removed and reapplied without showing evidence of tampering. The temperature to which the band is heated may be, for example, 300° F.

Extra layers of film may be built up on the bottom edge of the band or on other sections in order to give added tightness below a flange or the lip or other obstruction on the bottle or container. Other portions of the band may be made thin so as to cause the band to rupture at these places in opening the bottle. Tear tabs may be incorporated to facilitate removal of the bands.

Various color effects may be obtained by using differently colored plies for lamination, or the band may be printed or otherwise decorated as desired. By using film which has been pigmented certain areas of the band may be made opaque, leaving transparent sections for use on containers requiring visibility for tax stamps, etc. Opaque sections may also be formed by printing on the band prior to or after stretching.

Figure 2:
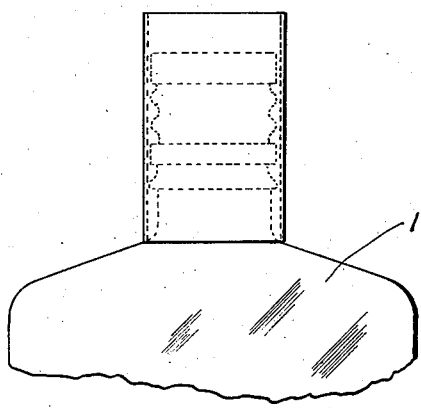
Figure 3:
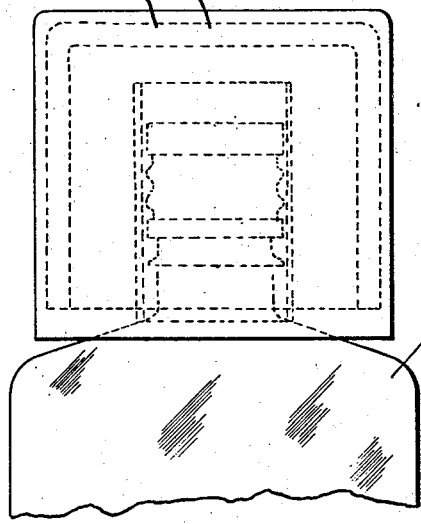
Figure 4:
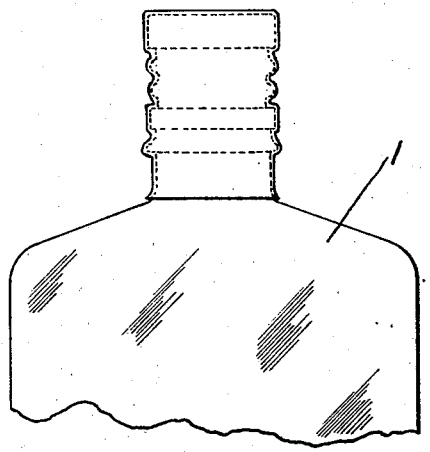

The invention will be further illustrated in connection with the accompanying drawing in which Fig. 1 illustrates one particular type of band. Fig. 2 shows a somewhat different type of band around the neck of a bottle before shrinking. Fig. 3 shows suitable heating means with the bottle in place therein to effect shrinkage of the band, and Fig. 4 shows the band shrunk around the neck of the bottle.

The band shown in Fig. 1 is made of plies of opaque material, $a$ and $b$, secured to plies of transparent material, $c$. The bands of opaque material are thicker than the band of transparent material.

This band is placed over the neck of the whiskey bottle 1. The bottle is first closed by the usual cork and the cork and lip of the neck may be covered by metal or other type of cap. The band of this invention may be used over any such usual type of closure means.

A cup-shaped type of heater which may be employed for heating the band is shown in Fig. 3. It is supplied by electrical current through the wires 4. When the bottle is brought near the source of heat, the band is heated by radiant energy and shrinks tightly onto the bottle neck as shown in Fig. 4. The top of the band in shrinking folds over the top of the cap of the bottle.

The band of this invention is moisture-vapor proof, waterproof and grease-proof as well as tamper-proof. Although described and claimed as a band, the shape may be varied somewhat to form a hood or the like, but in any event will include a band for encircling the neck of the bottle.

We claim:

1. The method of making a heat-shrinkable closure band which comprises winding rubber hydrochloride film around an expansible mandrel, heating and stretching by expanding the mandrel.

2. The method of making a heat-shrinkable band which comprises winding one or more layers of warm rubber hydrochloride film around a mandrel and stretching it on the mandrel and cooling while the band is under tension.

3. The method of making a heat-shrinkable closure band which comprises forming a rubber hydrochloride film into a relatively thin heated and stretched endless band by plying said film on a mandrel under tension, holding the band in its stretched condition on the mandrel while cooling the band, and after the band has set in its stretched condition removing the band from the mandrel.

4. The method of making a heat-shrinkable closure band which comprises plying up several plies of rubber hydrochloride film into an endless band and uniting the plies by heat and pressure and then stretching the band.

JAMES E. SNYDER.
CHARLES O. PIKE.